United States Patent

Sharif et al.

(10) Patent No.: US 9,565,198 B2
(45) Date of Patent: Feb. 7, 2017

(54) TENANT BASED SIGNATURE VALIDATION

(71) Applicant: Microsoft Technology Licensing, LLC, Redmond, WA (US)

(72) Inventors: Tariq Sharif, Redmond, WA (US); Yamin Wang, Redmond, WA (US); Jinghua Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/491,051

(22) Filed: Sep. 19, 2014

(65) Prior Publication Data

US 2015/0222643 A1 Aug. 6, 2015

Related U.S. Application Data

(60) Provisional application No. 61/934,490, filed on Jan. 31, 2014.

(51) Int. Cl.
*H04L 29/06* (2006.01)
(52) U.S. Cl.
CPC ......... *H04L 63/123* (2013.01); *H04L 63/0823* (2013.01)
(58) Field of Classification Search
CPC ...... H04L 63/123; H04L 63/0442; H04L 9/32; H04L 9/68
USPC ............................ 713/150, 153; 726/5–7, 28
See application file for complete search history.

(56) References Cited

U.S. PATENT DOCUMENTS

| | | | |
|---|---|---|---|
| 8,336,089 B1 | 12/2012 | Ahmed et al. | |
| 2002/0169954 A1* | 11/2002 | Bandini | G06Q 10/00 713/153 |
| 2011/0289581 A1 | 11/2011 | Gourevitch et al. | |
| 2012/0144024 A1* | 6/2012 | Lee | G06F 21/41 709/224 |
| 2012/0144501 A1* | 6/2012 | Vangpat | H04L 63/108 726/28 |
| 2012/0215918 A1 | 8/2012 | Vasters et al. | |
| 2012/0224690 A1* | 9/2012 | Chatt | H04L 63/0442 380/255 |
| 2013/0111558 A1 | 5/2013 | Sangubhatla et al. | |
| 2013/0117564 A1 | 5/2013 | Chang et al. | |
| 2013/0145006 A1* | 6/2013 | Tammam | G06F 9/5027 709/223 |
| 2013/0198511 A1 | 8/2013 | Yoo et al. | |

(Continued)

OTHER PUBLICATIONS

"Securing Multi-Tenant Applications", Published on: Jan. 19, 2013, Available at: http://msdn.microsoft.com/en-us/library/hh534483.aspx, 13 pgs.

(Continued)

*Primary Examiner* — Izunna Okeke
*Assistant Examiner* — Hee Song
(74) *Attorney, Agent, or Firm* — Julie Kane Akhter; Tom Wong; Micky Minhas

(57) ABSTRACT

Methods and systems are provided for validating a signature in a multi-tenant environment. A server or other computing device that is part of a distributed network may request a certificate collection from an identified tenant store. The requested certificate collection may be loaded in a virtual store that is accessible by the server or other computing device. The sever or other computing device may then access one or more certificates from the virtual store to validate a signature.

18 Claims, 9 Drawing Sheets

(56) References Cited

U.S. PATENT DOCUMENTS

| | | | |
|---|---|---|---|
| 2013/0205376 A1* | 8/2013 | Narasimha | H04L 9/3247 726/6 |
| 2013/0326210 A1* | 12/2013 | O'Connor | H04L 63/0428 713/150 |
| 2014/0052877 A1* | 2/2014 | Mao | H04L 61/103 709/245 |
| 2014/0090037 A1* | 3/2014 | Singh | H04L 63/0815 726/7 |
| 2014/0130142 A1* | 5/2014 | Plewnia | G06F 21/335 726/5 |
| 2014/0331297 A1* | 11/2014 | Innes | H04L 63/08 726/7 |

OTHER PUBLICATIONS

Kumbhare, Alok, et al., "Cryptonite: A Secure and Performant Data Repository on Public Clouds", In IEEE 5th International Conference on Cloud Computing (CLOUD), Jun. 24, 2012, 8 pages.

"International Search Report and Written Opinion Issued in PCT Patent Application No. PCT/US2015/013159", Mailed Date: May 8, 2015, 9 Pages.

\* cited by examiner

TENANT BASED SIGNATURE VALIDATION

CROSS-REFERENCE TO RELATED APPLICATIONS

The present application claims priority to and the benefit of U.S. Provisional Patent Application Ser. No. 61/934,490, filed Jan. 31, 2014, which application is hereby incorporated by reference in its entirety.

BACKGROUND

The deployment topologies of servers and services that are distributed across online environments are becoming increasingly complex. Applications require secure access across these servers and services regardless of their deployment characteristics or location. Public key infrastructure (PKI) operations are often tied to using content that is stored in a database. For example, trusted root certificates may be stored on a company's server and used for certificate validation. Based on this structure, tenants in a multi-tenant environment store their specific PKI data on a public machine store that is accessible to other tenants to perform certificate validation.

It is with respect to these and other general considerations that embodiments have been made. Also, although relatively specific problems have been discussed, it should be understood that the embodiments should not be limited to solving the specific problems identified in the background.

SUMMARY

In summary, the disclosure generally relates to validating custom signatures in a multi-tenant environment. More particularly, the disclosure relates generally to methods and systems for a server on a distributed network to access and virtually store tenant certificate collections as needed. The server or other computing device on the distributed network is configured with the capability to access secure and isolated tenant stores to load different tenant certificate collections as needed. Further, the server or other computing device on the distributed network is configured with the capability to delete virtually stored tenant certificate collections after use to free up storage space on the server and/or to maintain the confidentiality of the accessed tenant certificate collection.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures in which.

DETAILED DESCRIPTION

Figure 1:
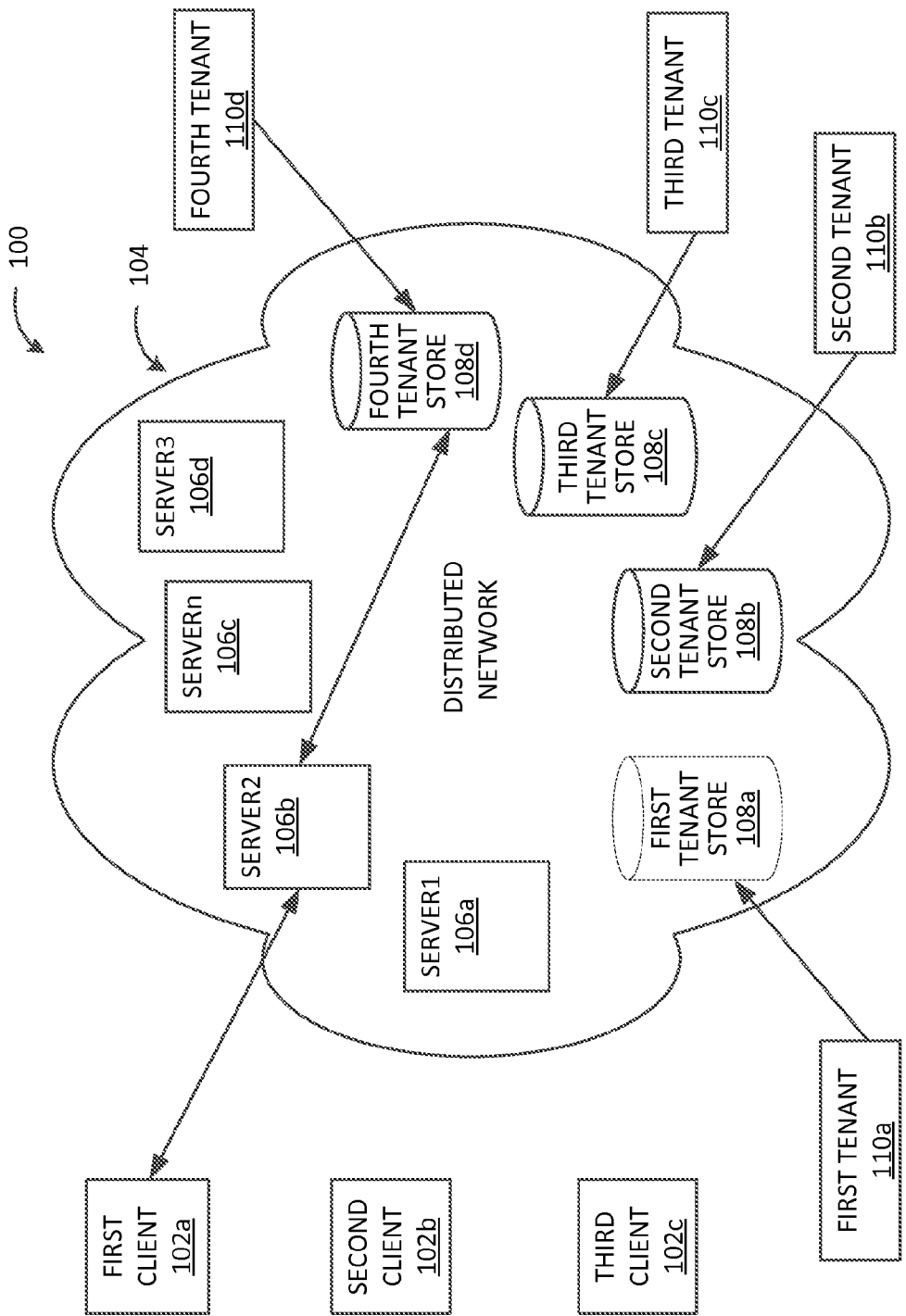
FIG. 1 illustrates an exemplary system of a distributed network for validating a custom signature in a multi-tenant environment, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

Throughout this specification, the term "platform" may be a combination of software and hardware components for providing data exchange using a protocol between a client and a server over a network. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

As briefly described above, embodiments of the disclosure are directed to validating a signature in a multi-tenant environment. In embodiments, the signature is of an S/MIME email in a multi-tenant environment. Currently, a user of a tenant sends a MIME message, such as an email, to a client using his private key (also referred to herein as a signing certificate). While the discussion refers to an email message, it is understood by a person of skill in the art that any messages or other type of data may be practiced with the embodiments disclosed herein. A "user" as used herein refers to any individual or machine associated with a tenant. A "tenant" as used herein refers to any company, organization, or grouping of users.

The client may wish verify the signature of the email message sent from the user or, in other words, verify that the email was sent from the listed sender. To verify the signature of the email, the client sends the signature or signing certificate back to the server associated with the sender/tenant that sent the email for the user. The server of the tenant stores a list of each user's certificate requirements or certificate for validating the user's signature (also referred to herein as a certificate, signing certificate, signature, private key, or custom signature). The listing of the certificate requirements or certificates for each user of a tenant is referred to herein as a certificate collection. The tenant server uses the identified user's certificate requirements or certificate from the stored certificate collection to attempt to validate the received certificate.

For security reasons, the availability of the certification collection is limited. Most tenants prefer that no one outside of the tenant or the tenant server has access to the certificate collection or access to any tenant's certificate requirements or certificate listed on the certificate collection. If the tenant server can validate the received signing certificate from the client using the identified user's certificate requirements or certificate, the server sends a notice to the client that the signature is valid or that the email was sent from the identified user. If the tenant server cannot validate the received signing certificate from the client using the identified user's certificate requirements or certificate, the server sends a notice to the client that the signature is invalid or that the email was not sent from the identified user. If the signature is valid, the message was indeed sent by the tenant or sender identified in the message. The tenant server generates the certificate collection by accessing and storing the certificate requirements or certificate from each user. In some examples, a signature or signing certificate may be found invalid if the message was modified in route to the client, if the user's signing certificate was revoked, or if the certificate requirements or certificate for the user no longer exists (e.g., an email address is deactivated when an employee leaves a company).

In a multi-tenant environment, multiple tenants having numerous certificates may be sent by clients to servers in a distributed network for validation. Under the currently utilized validation process, servers are configured to utilize a stored certificate collection. However, it is not feasible for a server in a distributed network to store the certificate collection for each tenant on the network. First, the servers in the distributed network are accessible to multiple tenants. As such, allowing each tenant to access the servers on the distributed network compromises the security of the distributed network. Second, the servers in the distributed network have a limited storage capacity using traditional storage model and are not capable of storing each tenant's certificate collection.

To address the above limitations, embodiments of the present disclosure relate generally to methods and systems for a server on a distributed network to access tenant certificate collections from private tenant stores on the distributed network and virtually store tenant certificate collections as needed. In embodiments, the information on a specific tenant store on the distributed network is not accessible by other tenants or publically available. As such, the tenants can upload or import and save their certificate collection to their tenant store on the distributed network without compromising the security of the distributed network. Accordingly, embodiments of the present disclosure relate generally to methods and systems for a server that does not have to access a local tenant machine and does have a copy of the tenant's certificate collection. In embodiments, the server may access a certificate collection and load it as a virtual store. Additionally, the server on the distributed network may be configured to delete virtually stored tenant certificate collections from the server after use to free up storage space on the server and/or to maintain the confidentiality of the accessed tenant certificate collection.

Figure 2:
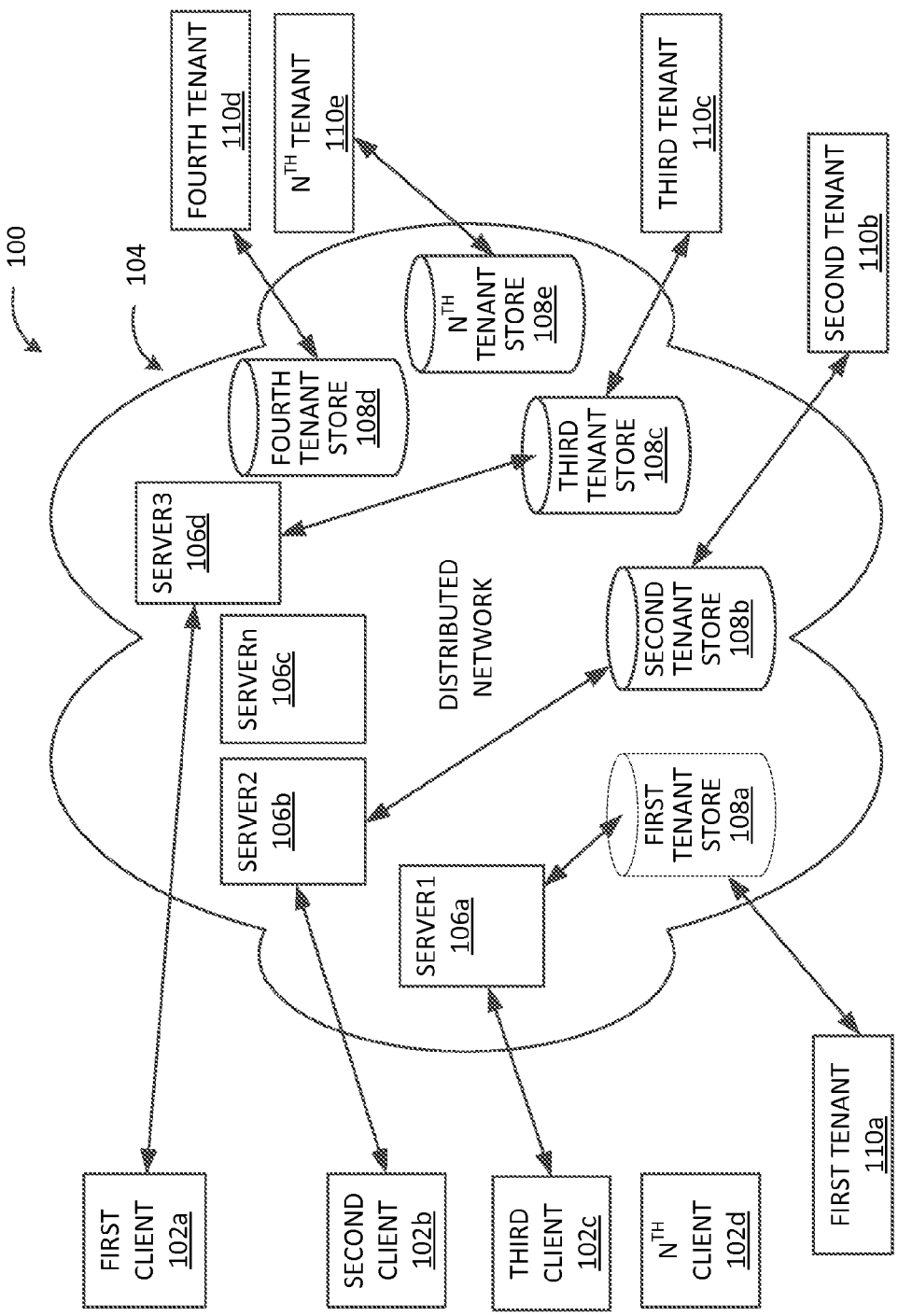
FIG. 2 illustrates an exemplary system of a distributed network for validating a custom signature in a multi-tenant environment, according to yet another example embodiment.
Figure 3:
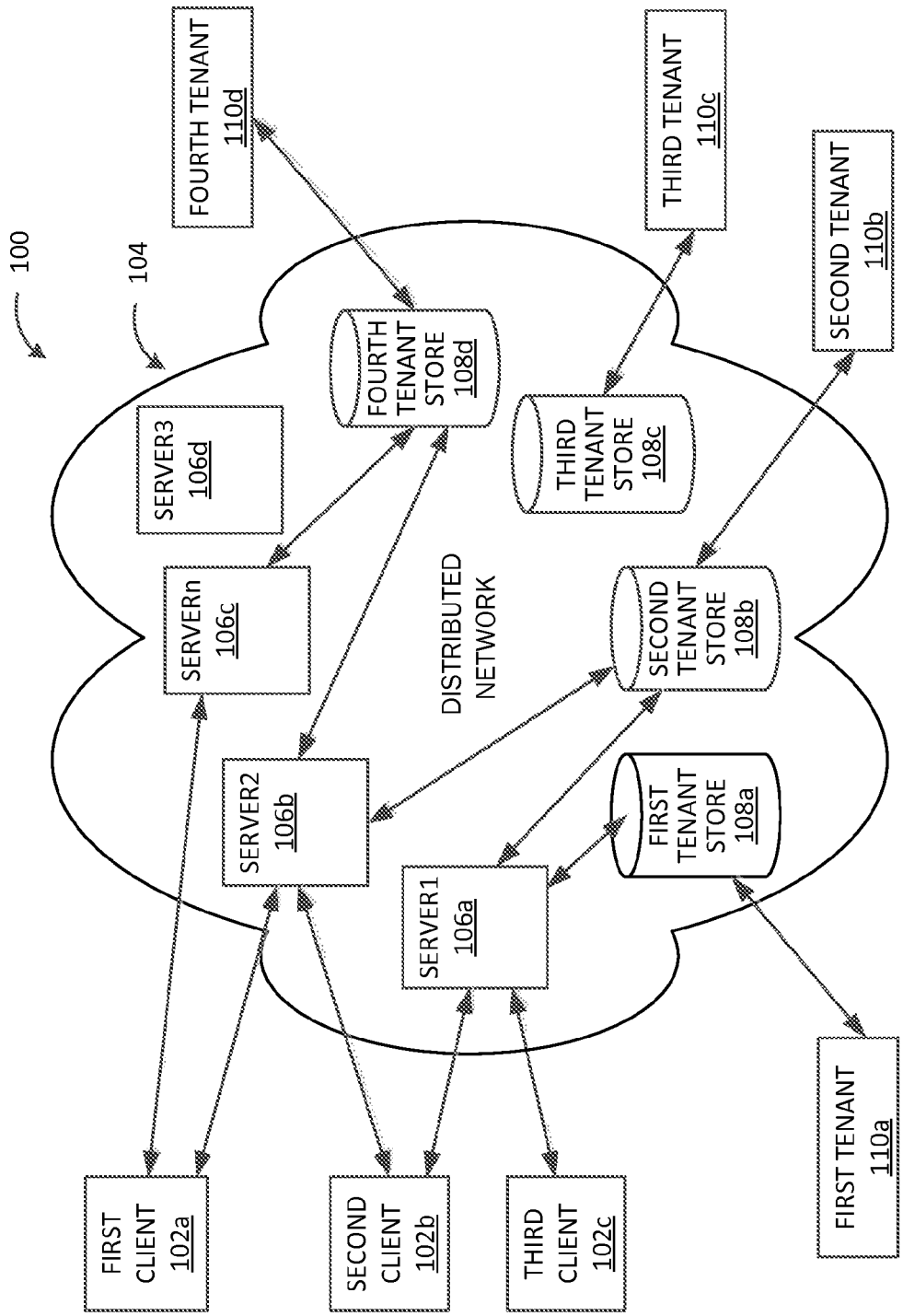
FIG. 3 illustrates an exemplary system of a distributed network for validating a custom signature in a multi-tenant environment, according to an example embodiment.

FIGS. 1-3 illustrate an exemplary system 100 of a distributed network 104 for validating a signature of a message in a multi-tenant environment, according to example embodiments. In some embodiments, the signature validation illustrated in FIGS. 1-3 may be performed in accordance with an S/MIME protocol; however, other verification protocols may be employed with the embodiments disclosed herein. The system 100 includes clients 102, a distributed network 104, and tenants 110. While the system 100 illustrated in FIGS. 1-3 has three or four different clients 102a, 102b, 102c, and 102d and four or five different tenants 110a, 110b, 110c, 110d, and 110e, the illustrated number of clients 102 and tenants 110 are exemplary only. One of skill in the art will appreciate that the system 100 may include any number of clients 102d and/or tenants 110e.

The client 102 as used herein refers to any individual, user, or machine that receives a signed message from a server 106 on a distributed network. In embodiments, the client 102 is not associated with a tenant 110. In some embodiments, the client 102 is associated with a tenant 110. The tenant 110, as discussed above, refers to any company, organization, or grouping of users. Users, as discussed above, refer to any individual or machine associated with a tenant 110.

The distributed network 104 may contain two or more servers connected over a network (e.g., a WAN, a LAN, a Wi-Fi network, the Internet, etc.). A distributed network 104 may also be referred to herein as a cloud or a distributed network of servers. The distributed network 104 includes servers 106 and tenant stores 108. While the distributed network 104 illustrated in FIGS. 1-3 has four different servers 106a, 106b, 106c, and 106d and four or five different stores 108a, 108b, 108c, 108d, and 108e the illustrated number of servers 106 and stores 108 are exemplary only. One of skill in the art will appreciate that the distributed network 104 may include any number of servers 106c and/or stores 108e.

Example applications executed at a client 102 that interact with the distributed network 104 are one or more productivity applications (e.g., a word processor, a presentation applications, a spreadsheet application, etc.) and one or more communication applications (e.g., email applications, instant messaging applications, video streaming applications, social media applications, calendaring applications, games etc.) or any applications that require a client device and a server to communication (e.g., banking applications, internal company applications, and etc.) over a distributed network. Example client devices 102 may include a desktop computer, a laptop computer, a tablet, a smart watch, a wearable computer, a mobile phone, a smartphone, an electronic whiteboard, and/or other similar client devices. The communication service and the productivity service may also work in conjunction to retrieve and exchange email and/or other data.

An example productivity application may be configured to provide access to various services built around a productivity platform. In embodiments, the services are executed or hosted on a remote device, such as server 106 in the distributed network. Some productivity services may include, but are not limited to, a collaboration application, an enterprise management application, a messaging application, a word processing application, a spreadsheet application, a database application, a presentation application, etc. The productivity service may provide access to data associated with the various productivity applications hosted on a remote device by retrieving the data, for example, from a remote server 106 on a distributed network 104. The server 106 may be accessed over a network 104, which may be a wired or wireless network, or a cloud network, and the retrieved data may be loaded, and/or manipulated. Exemplary networks may include, but are not limited to, cellular data networks, working area networks (WANs), local area networks (LANs), the Internet, etc.

Similarly, an example communication application may be an application or service configured to provide email, contacts management, and/or calendar services. In embodiments, the communication application may also provide one or more real-time communications platforms, such as instant messaging, audio/visual conferencing, and presence detection. For example, a user may receive, view and reply to emails using the communication application executed on the client 102 and received from the distributed network 104.

As illustrated in FIG. 1, server2 106*b* from the distributed network 104, sends a first client 102*a* data from a user of the fourth tenant 110*d* with a signature. In some embodiments, the sent data is an email message. The first client 102*a* requests validation of the received signing certificate from the server2 106*b* from which the client 102*a* received the data. The server2 106*b* identifies the tenant 110 that relates to or is associated with the signing certificate for validation. In the embodiment illustrated in FIG. 1, the server2 106*b* identifies that the signing certificate is associated with the fourth tenant 110*d*.

Accordingly, server2 106*b* accesses a certificate collection on the fourth tenant store 108*d* on the distributed network 104. In some embodiments, the server2 106*b* accesses the certificate collection on the fourth tenant store 108*d* by requesting access to the fourth tenant store 108*d* and/or to the certificate collection on the fourth tenant store 108*d*. In further embodiments, the server2 106*b* accesses the certificate collection on the fourth tenant store 108*d* by reading the fourth tenant store 108*d* and/or by reading the certificate collection on the fourth tenant store 108*d*.

As discussed above, the tenant store 108 is located on the distributed network 104 and stores a tenant's organization data and/or configuration information. The information on tenant store 108*d* is isolated and separated from other tenant stores 108*a*, 108*b*, and 108*c*. According, the information saved on each tenant store 108 is not publically accessible nor is it accessible to other tenants on the distributed network 104. As discussed above, the certificate collection is a list certificates for validating a signature of a signed message sent by a user associated with the tenant 110. A certificate collection for a tenant 110 is uploaded or imported and saved to the tenant store 108 by a tenant administrator. In some embodiments, the tenant administrator imports and saves the certificate collection using a remote PowerShell or graphical user interface for a tenant administrative task. As illustrated in FIGS. 1-3 each tenant 110*a*, 110*b*, 110*c*, 110*d*, and 110*e* have dedicated storage space on the distributed network 104 to which the individual tenants can import and saved their certificate collection on their representative tenant store 108*a*, 108*b*, 108*c*, 108*d*, 108*e*.

Once server2 106*b* accesses the certificate collection for the fourth tenant 110*d* from the fourth tenant store 108*d*, the server2 106*b* loads the certificate collection to the server2 106*b*. In some embodiments, the server2 106*b* loads the certificate collection to the server2 106*b* as a fourth tenant virtual store. The server2 106*b* then validates the signing certificate using the virtual store. In some embodiments, during validation, the server2 106*b* attempts to validate the specified user of the tenant's 110*d* signature against the certificates or certificate requirements in the virtual store for the specified user from the certificate collection. If the server2 106*b* validates the signing certificate, the server2 106*b* sends a notice to the first client that the signing certificate is valid. If the server2 106*b* cannot validate the signing certificate, the server2 106*b* sends a notice to the first client that the signing certificate is invalid.

Alternatively, in some embodiments, the server 106 on the distributed network may send the virtual store to the client sending the request and allows the client to determine if the signing certificate is valid based on the sent certificate collection in the virtual store. In alternative embodiments, sever determines the certificate requirements for the user from the virtual store and sends the user's certificate requirements or certificate to the client sending the request and allows the client to determine if the signing certificate is valid based sent requirements or certificate.

In some embodiments, the virtual store on the server2 106*b* is deleted immediately after use by the server2 106*b*. In other embodiments, the virtual store is held by the server2 106*b* for a predetermine amount of time. For instance, the virtual store may be held after use by the server2 106*b* for 50 milliseconds, 1 second, 5 seconds, 30 seconds, 1 minute, 2 minutes, 5 minutes, 10 minutes, 15 minutes, 30 minutes, 1 hour, 2 hours, 5 hours, 10 hours, 12 hours, or 1 day. This list is exemplary and is not limiting. A person of skill in the art will appreciate that any desirable predetermined amount of time may be utilized before deleting the virtual store. In alternative embodiments, the virtual store is held by the server until a specific event occurs. For example, the virtual store may be held after use until the server2 106*b* receives a request to validate a signing certificate of a different tenant. In another example, the virtual store is held after use until the server2 106*b* reaches a predetermined amount of storage capacity.

While the discussion of FIG. 1 was directed to a specific embodiment, the operations performed by the first client 102*a* may be performed by any client 102 of a system 100. Additionally, while the discussion of FIG. 1 was directed to a specific embodiment, the steps performed by the server2 106*b* may be performed by any server 106 of the distributed network 104 in response to a request for validating a signing certificate for any user of any tenant 110 from any client 102 simultaneously, at staggered times, and/or at overlapping times.

The exemplary systems illustrated in FIGS. 2 and 3 show that various servers 106 on the distributed network 104 can receive requests for validating signing certificates from multiple users from different tenants 110*a*, 110*b*, 110*c*, 110*d*, and/or 110*e* from numerous clients 102*a*, 102*b*, 102*c*, and/or 102*d*. The servers 106 of the distributed network 104 may receive requests to validate messages from various clients 102 simultaneously, at staggered times, or at overlapping times. Further, one or more servers 106 of the distributed network 104 may receive multiple requests for signing certificate validation from various clients 102 simultaneously, at staggered times, or at overlapping times.

For example, FIG. 2 illustrates that the first client 102*a* requests validation of a signing certificate received from a user of the third tenant 110*c* via server3 106*d*, while the second client 102*b* requests validation of a signing certificate received from a user of the second tenant 110*b* via server2 106*b*, and while the third client 102*c* requests validation of a signing certificate received from a user of the first tenant 110*a* via server2 106*b*. Each server that receives a request as displayed in FIG. 2 identifies the tenant 110 associated with the signing certificate and accesses the appropriate tenant store 108. For example, server3 106*d* accesses the third tenant's certificate collection on the third tenant store 108*c*, server2 106*b* accesses the second tenant's certificate collection on the second tenant store 108*b*, and server1 106*a* accesses the first tenant's certificate collection on the first tenant store 108a. After accessing the appropriate tenant's certificate collection, each server 106a, 106b, and 106d loads the certificate collection from the appropriate store as the virtual store. Once the appropriate tenant's certificate collection is loaded, each server 106a, 106b, and 106d checks the validity of their received message or signing certificate using the appropriate user's certificate requirements or certificate from the virtual store. After determining the validation of the signing certificate, each server 106a, 106b, and 106d sends a notice of the determined validity of the signing certificate to the client 102a, 102b, and 102c that made the request. Each sever 106a, 106b, and 106d may be performing the validation of the signing certificates simultaneously, at overlapping times, and at staggered times.

In some embodiments, the client 102 sends the request to validate a signing certificate from a user of a specific tenant 110 to the server 106 on the distributed network 104 from which the client received the data signed with the certificate. In other embodiments, the client may send the request to validate a signing certificate from a user of specific tenant 110 to a different server 106 on the distributed network from which the client received the data with the signing certificate. In some embodiments, the server 106 that sends the data with a signing certificate to the client 102 is selected because the server 106 has the most available processing capacity of the servers 106 on the distributed network 104. In other embodiments, the server 106 that sends the data with a signing certificate to the client 102 is selected based on location, processing capacity, load blanching, and/or storage space available.

Multiple servers 106 may receive multiple requests from the same or different clients 102. For example, FIG. 3 illustrates that client 102a sent two requests to validate two different signing certificates from a user of the fourth tenant 110d via server 106b and 106c. FIG. 3 further illustrates that the second client 102b received data with a signing certificate from a user of the second tenant 110b from server2 106b and requested validity of the signing certificate for the user of the second tenant from server1 106a. Based on this request from the second client 102b, server1 106a accessed the certificate collection on the second tenant store 108b, loaded the certificate collection in a virtual store, determined the validity of the received signing certificate from the user of the second tenant store 108b, and sent a validity notice based on the validity determination to the second client 102b. While server1 106a is processing the request from the second client 102b, server1 106a may send data with a signing certificate from a user of a first tenant 110a to the third client 102c. In some embodiments, the data with a signing certificate received by the client is data for an email application, an instant message, a calendar application, a contact application, a social media application, or a game application. This list is exemplary only and is not limiting. Additionally, FIG. 2 illustrates that any number of tenant stores ($n^{th}$ tenant store 108e) or tenants ($n^{th}$ tenants 110e) may be utilized by system 100.

The example systems in FIG. 1 through 3 have been described with specific configurations, applications, and interactions. Contemplated embodiments, however, are not limited to systems according to these examples. A system for providing a communication connection to establish a session between a client and a server and to exchange data over a network may be implemented in configurations that employ fewer or additional components and perform other tasks. Furthermore, although specific protocols have been described herein, one of skill in the art will appreciate that other protocols and/or interfaces may be employed with the embodiments disclosed herein.

Figure 4:
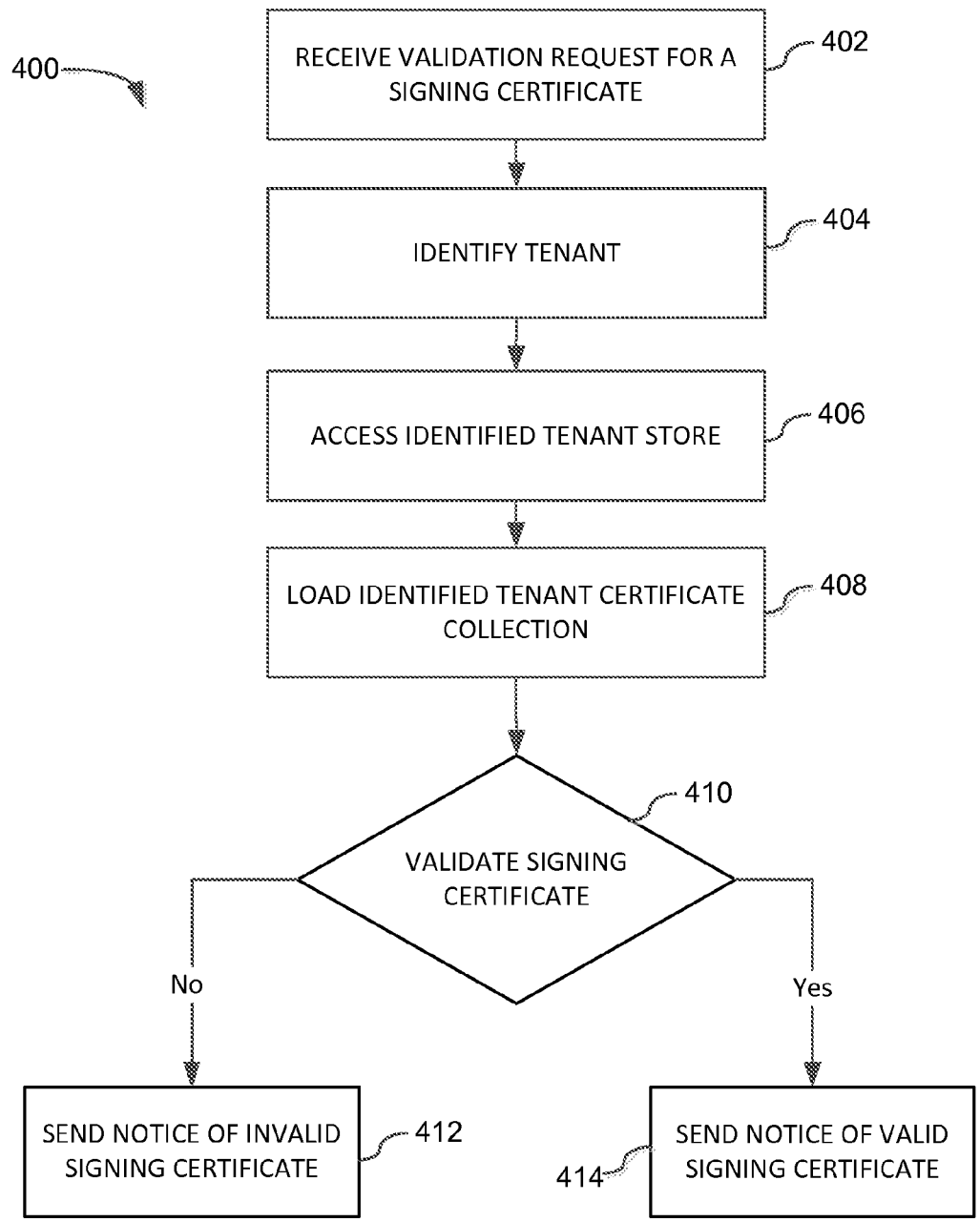
FIG. 4 illustrates an exemplary method for validating a custom signature in a multi-tenant environment, according to an example embodiment.

Referring now to FIG. 4, an exemplary method for validating a custom signature, according to an example embodiment, is shown. Method 400 may be implemented on a computing device or similar electronic device capable of executing instructions through a processor. In some embodiments, the computing device may be one or more servers that are a part of a distributed network of servers. In instances where the method 400 is implemented by more than one server, execution of the different operations that make up method 400 may be performed by different servers that are part of the distributed network. Further, the server on the distributed network performing method 400 according to embodiments may be configured to access a certificate collection on a tenant store in a distributed network in response to a client request for signature validation.

Method 400 begins with receiving operation 402. A server that is part of a distributed network receives a request to validate a signing certificate (also referred to herein as a custom signature, signature, or certificate) from a client. The client may send the request to the server in response to receiving a message or data from a user. In some embodiments, the data received by the client is an email message, an instant message, or a calendar invitation. In other embodiments, the data received by the client may be a video, a document, an image, a spreadsheet, or any other type of data file(s). In embodiments, the data received by the client includes a signing certificate or signature that indicates that the data was sent to the client from a specific user of a specific tenant.

After receiving the request, flow continues to identifying operation 404. At identifying operation 404, a tenant is identified out of a plurality of tenants associated with the distributed network. The identified tenant may be associated with a user indicated as the sender of the message or data. In some embodiments, the plurality of tenants may include each tenant associated with the distributed network or a subset of tenants associated with the distributed network. The server may identify the tenant using a tenant identifier, a user identifier, or any other type of identifier associated with the request sent by the client or message/data received by the client.

Next, flow continues to accessing operation 406. At accessing operation 406, the tenant's certificate collection from the identified tenant's tenant store on the distributed network is accessed. In some embodiments, accessing operation 406 includes requesting access to the certificate collection and/or the identified tenant store. In other embodiments, accessing operation 406 may include reading the certificate collection directly from identified tenant store. In some embodiments, the certificate collection is a file saved on the tenant store. In embodiments, the tenant store may be an isolated data store that is part of a distributed network. In such embodiments, the data store is isolated such that only the tenant has read and/or write access privileges to the data store. In embodiments, the certificate collection may be uploaded and saved to the tenant store by the tenant administrator. The tenant store may be used to store tenant data and tenant configuration information. As discussed above, the information saved on the tenant store on the distributed network is isolated and separate from other tenants. The information on the tenant store including the certificate collection is not accessible to other tenants, users, and/or clients on the distributed network, thereby maintaining the security of the distributed system. In some embodiments, the information on the tenant store, including the certificate collection, may not be publically available.

Flow continues to loading operation 408. At loading operation 408, the certificate collection is loaded to a virtual store. The virtual store may reside in memory that the device performing the method 400 can access. In some embodiments, the certificate collection is loaded as a virtual store (also referred to herein as a file or virtual file). In some embodiments, the virtual store is deleted after use of the virtual store. In other embodiments the virtual store is deleted after use of the virtual store after a predetermined amount of time or after a specific event occurs.

Flow continues to validation decision operation 410. At validation decision operation 410, a determination is made as to whether the signing certificate is validated using the certificate requirements or the certificate from the virtual store. In some embodiments, after identifying the specific user (e.g., using an identifier) of the tenant, the server accesses the user's corresponding certificate or requirements from the certificate collection on the virtual store. In these embodiments, a determination of whether the signing certificate from the user is valid is made by utilizing the certificate requirements or a certificate for the user listed within the certificate collection saved on the server as the virtual store. In some embodiments, the signing certificate is compared to the certificate requirements to determine if the signing certificate is valid. If the signing certificate meets the certificate requirements, the signing certificate is valid. If the signing certificate does not meet the certificate requirements, the signing certificate is not valid. In other embodiments, the signing certificate is compared to the user's certificate from the certificate collection. In these embodiments, if the signing certificate is the same as the user's certificate from the certificate collection, the signing certificate is valid. In these embodiments, if the signing certificate is not the same as the user's certificate from the certificate collection, the signing certificate is invalid . . . . If a determination is made that the signing certificate is invalid during operation 410, flow branches "No" to operation 412. If a determination is made that the signing certificate is valid during operation 410, flow branches "Yes" to operation 414.

At sending invalid notice operation 412, a notice is sent to the client that that the signing certificate from the user of the tenant is invalid. Based on this notice, the client is notified that the data received with the signing certificate was not sent from the identified sender (the user of the tenant). A signature or signing certificate may be found invalid if the message was modified in route to the client or if the certificate requirements for the user no longer exist (e.g., an email address is inactivated when an employee leaves a company). In yet another embodiment, a certificate revocation list (CRL) may indicate that the certificate is invalid. A person of skill in the art appreciates that there are numerous other reasons why a signing certificate may be found invalid.

At sending valid notice operation 414, notice is sent to the client that that the signing certificate from the user of the tenant is valid. As such, the client is notified that the data received with the signing certificate was sent from the identified sender (the user of the tenant).

In an alternative embodiment, the device performing the method 400 does not perform operations 410, 412, and 414 during method 400 and instead identifies the certificate requirements or certificate that corresponds to the user of the identified tenant from the identified tenant's certificate collection on the virtual store and sends the user's requirements or certificate to the client requesting validation. In this embodiment, the client utilizes the requirements or certificate to determine if the signing certificate is valid. In some embodiments, the client determines that the signing certificate from the user of the identified tenant is valid if the user's certificate requirements or certificate can be used to validate the user's signing certificate and determines that the signing certificate from the user of the identified tenant is invalid if the user's certificate or certificate requirements cannot validate the user's signing certificate.

In alternate embodiments, a device performing method 400 does not perform operations 410, 412, and 414 during method 400 and instead sends the virtual store containing the identified tenant's certificate collection to the client requesting validation. During these embodiments, the client uses the certificate collection from the virtual store to determine if the signing certificate is valid. The client may identify the user's certificate requirements from the list of certificate requirements in the certificate collection and utilizes the user's certificate requirements to determine if the user's signing certificate is valid. In some embodiments, the client determines that the signing certificate from the user of the identified tenant is valid if the user's signing certificate meets the user's certificate requirements and determines that the signing certificate from the user of the identified tenant is invalid if the user's signing certificate does not meet the user's certificate requirements.

While method 400 is directed to the receipt of a single signing certificate from first tenant, the method 400 may be employed to handle several different signing signatures for several different clients (e.g., a first client, a second client, a third client, a fourth client, a fifth client, . . . and an a $n^{TH}$ client) for several different tenants (e.g., a first tenant, a second tenant, a third tenant, a fourth tenant, a fifth tenant, . . . and a $n^{TH}$ tenant) each tenant having their own tenant store (a first tenant store, a second tenant store, a third tenant store, a fourth tenant store, a fifth tenant store, . . . and a $n^{TH}$ tenant store) simultaneously, at overlapping times, or at staggered times. Further, method 400 may be performed by several devices (first server, second server, third server, a fourth server, a fifth server, . . . and a $n^{TH}$ server) within the distributed network for one or more clients simultaneously, at overlapping times, or at staggered times.

Figure 5:
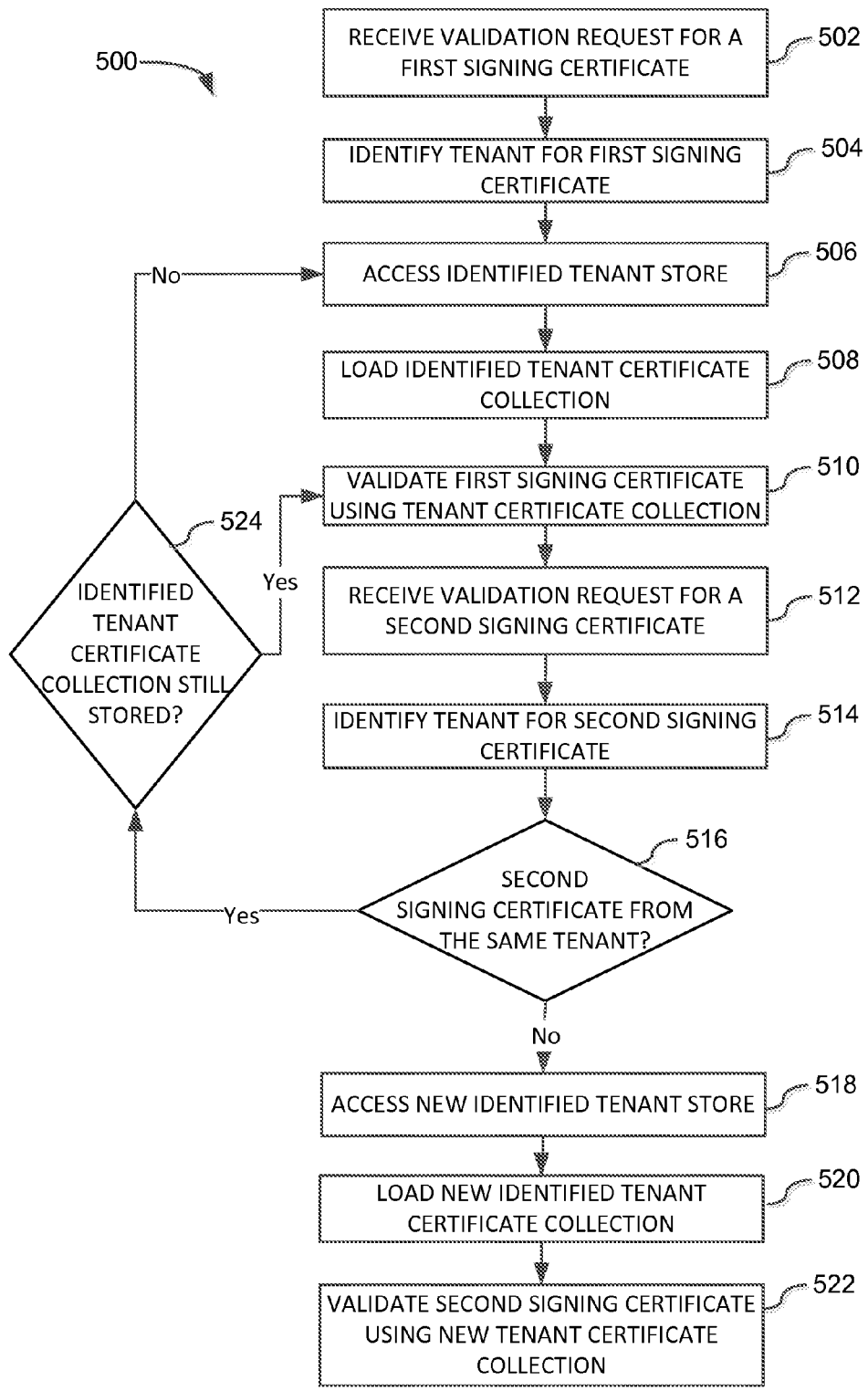
FIG. 5 illustrates an exemplary method for validating a custom signature in a multi-tenant environment, according to yet another example embodiment.

Referring now to FIG. 5, an exemplary method for validating a signature, according to an example embodiment, is shown. Method 500 may be implemented on a computing device or similar electronic device capable of executing instructions through a processor. In some embodiments, the computing device may be one or more servers that are part of a distributed network of servers. In instances where the method 500 is implemented by more than one server, execution of the different operations that make up method 400 may be performed by different servers that are part of the distributed network. Further, a server on the distributed network performing method 500 according to embodiments may be configured to access a certificate collection on a tenant store in a distributed network in response to a client request client request to validate data or for signature validation. In further embodiments, the method 500 may be performed according S/MIME protocol; however, one of skill in the art will appreciate that other protocols may be employed with the method 500. Method 500 is similar to method 400 except that method 500 relates to receiving two separate validation requests for two different signing certificates.

Method 500 begins with receiving operation 502. Receiving operation 502 is similar to receiving operation 402 of method 400. At receiving operation 502, a request to validate a first signing certificate (also referred to herein as a custom signature, signature, or certificate) is received from a client. The client may send the request to the server in response to receiving a message or data from a user. In some embodiments, the data received by the client is an email message, an instant message, or a calendar invitation. In other embodiments, the data received by the client may be a video, a document, an image, a spreadsheet, or any other type of data file(s). In embodiments, the data received by the client includes a first signing certificate or first signature that indicates that the data was sent to the client from a specific user of a specific tenant.

After receiving the request, flow continues to identifying operation 504. Operation 504 is similar to operation 404 of method 400. At identifying operation 504, a tenant is identified out of a plurality of tenants associated with the distributed network. The identified tenant may be associated with a user indicated as the sender of the message or data. In some embodiments, the plurality of tenants may include each tenant associated with the distributed network or a subset of tenants associated with the distributed network. The server may identify the tenant using a tenant identifier, a user identifier, or any other type of identifier associated with the request sent by the client or message/data received by the client.

Next, flow continues to accessing operation 506. Operation 506 is similar to operation 406 of method 400. At accessing operation 506 the tenant's certificate collection from the identified tenant's tenant store on the distributed network is accessed. In some embodiments, accessing operation 506 includes requesting access to the certificate collection and/or the identified tenant store. In other embodiments, accessing operation 506 may include reading the certificate collection directly from the identified tenant store. In embodiments, the tenant store may be an isolated data store that is part of a distributed network. In such embodiments, the data store is isolated such that only the tenant has read and/or write access privileges to the data store. In embodiments, the certificate collection may be uploaded and saved to the tenant store by the tenant administrator. The tenant store may be used to store tenant organization data and tenant configuration information. As discussed above, the information saved on the tenant store on the distributed network is isolated and separate from other tenants. The information on the tenant store including the certificate collection is not accessible to other tenants, users, and/or clients on the distributed network, thereby maintaining the security of the distributed system. In some embodiments, the information on the tenant store, including the certificate collection, is may not or be publically available.

Flow continues to loading operation 508. Operation 508 is similar to operation 408 of method 400. At loading operation 508, the certificate collection is loaded to a virtual store. The virtual store may reside in memory that the device performing method 500 has access to. In some embodiments, the virtual store deletes the virtual store after use. In other embodiments, the virtual store is deleted after use of the virtual store after a predetermined amount of time or after a specific event occurs. For example, in some embodiments, the virtual store is deleted when a request to validate is received for a second signing certificate after use of the virtual store. In another example, in some embodiments, the virtual store is deleted 30 milliseconds, 2 seconds, 3 seconds, 42 seconds, 1.5 minutes, 4 minutes, 6 minutes, 12 minutes, 40 minutes, 45 minutes, 1.5 hours, 3 hours, 4 hours, 6 hours, 9 hours, or 2 days after use of the virtual store.

Flow continues to validation operation 510. Operation 510 is similar to validation decision operation 410 of method 400. At validation operation 510, the first signing certificate is validated using certificate requirements or certificate from the identified tenant virtual store. In some embodiments, after identifying the specific user (e.g., using and identifier) of the tenant, the server accesses the user's corresponding certificate requirements or certificate from the certificate collection on the virtual store. In these embodiments, a determination of whether the first signing certificate from the user is valid is made by utilizing the certificate requirements or certificate for the user listed within the certificate collection saved on the server as the virtual store. In some embodiments, the first signing certificate is compared to the certificate requirements to determine if the first signing certificate is valid. If the first signing certificate meets the certificate requirements, the first signing certificate is valid. If the first signing certificate does not meet the certificate requirements, the first signing certificate is not valid. In alternative embodiments, the first signing certificate is compared to the user's certificate from the certificate collection. In these embodiments, if the first signing certificate is the same as the user's certificate from the certificate collection, the first signing certificate is valid. In these embodiments, if the first signing certificate is not the same as the user's certificate from the certificate collection, the signing certificate is invalid. If a determination is made that the first signing certificate is invalid during operation 510, a notice of the invalid first signing certificate is sent to the client. If a determination is made that the first signing certificate is valid during operation 510, a notice of the valid first signing certificate is sent to the client.

In an alternative embodiment, the server on the distributed network does not determine the validity of the first signing certificate during operations 510 of method 500 and instead during operation 510 identifies the certificate requirements or certificate that corresponds to the user of the identified tenant from the identified tenant's certificate collection on the virtual store and sends the user's requirements or certificate from the virtual store to the client requesting validation. In this embodiment, the client utilizes the requirements or certificate to determine if the first signing certificate is valid. In some embodiments, the client determines that the first signing certificate from the user of the identified tenant is valid if the first signing certificate meets the certificate requirements and determines that the first signing certificate from the user of the identified tenant is invalid if the user's signing certificate does not meet the user's certificate requirements.

In another embodiment, the server on the distributed network does not determine the validity of the first signing certificate during operations 510 of method 500 and instead during operation 510 sends the virtual store containing the identified tenant's certificate collection to the client requesting validation. During these embodiments, the client uses the certificate collection to determine if the first signing certificate is valid. The client may identify the user's certificate requirements or certificate from the list of certificates or requirements in the certificate collection and utilizes the user's requirements or certificate to determine if the user's signing certificate is valid. In some embodiments, the client determines that the first signing certificate from the user of the identified tenant is valid if the user's signing certificate meets the user's certificate requirements and determines that the first signing certificate from the user of the identified tenant is invalid if the signing certificate does not meet the user's certificate requirements.

Flow continues to second receiving operation 512. Second receiving operation 512 is similar to receiving operation 502 in that during operation 512 a second request for validating a second signing certificate is received. The second request may be made by the same client that made the first request or may be made by a different client from the client that made the first request. In some embodiments, the data received by the client with the second signing certificate is an email message, an instant message, or a calendar invitation. In other embodiments, the data received by the client may be a video, a document, an image, a spreadsheet, or any type of data file(s). This list is exemplary only and is not limiting. In embodiments, the data received by the client includes a second signing certificate that indicates that the data was sent to the client from a specific user of a specific tenant.

After receiving the request, flow continues to identifying operation 514. Operation 514 is similar to operation 504. At identifying operation 504, a tenant is identified out of a plurality of tenants associated with the distributed network. The identified tenant may be associated with a user indicated as the sender of the message or data. The server may identify the tenant by using a tenant identifier, a user identifier, or any other type of identifier associated with the request sent by the client or message/data received by the client.

Flow continues to comparison determination operation 516. At comparison determination operation 516 a determination is made as to whether the identified tenant for the second signing certificate is the same as the identified tenant for the first signing certificate. At comparison determination operation 516, a determination is made as to whether the tenants for the first and second signing certificates are the same by comparing the two tenants to each other. If a determination is made that the tenants are the same, flow branches "Yes" to operation 524. If a determination is made during operation 516 that the identified tenant for the first signing certificate is different from the identified tenant for the second signing certificate and is a new tenant, flow branches "No" to operation 516.

At store determination operation 524, a determination is made as to whether the virtual store for the identified tenant is still stored on the server. At store determination operation 524 a determination is made as to whether the virtual store for the identified tenant is still accessible in memory. If a determination is made that virtual store is still stored or otherwise accessible, flow branches "Yes" to operation 510 and flow continues from there. If a determination is made during operation 524 that virtual store is not still stored or is not accessible, flow branches "No" to operation 506 and flow continues from there.

At new accessing operation 518, the new tenant's certificate collection from the new tenant's tenant store is accessed. The new tenant is the tenant identified at operation 514 that is different from the tenant identified at operation 506. In some embodiments, new accessing operation 518 includes requesting access to the certificate collection and/or the new tenant store. In other embodiments, accessing operation 506 may include reading the certificate collection directly from the new tenant store. In some embodiments, the certificate collection is a file saved on the new tenant store. In embodiments, the new tenant store may be an isolated data store that is part of a distributed network. In such embodiments, the data store is isolated such that only the tenant has read and/or write access privileges to the data store. In embodiments, the certificate collection may by uploaded and saved to the new tenant store by the new tenant administrator. The new tenant store may be used to store new tenant data and new tenant configuration information. As discussed above, the information saved on the new tenant store on the distributed network is isolated and separate from other tenants. The information on the new tenant store including the certificate collection is not accessible to other tenants, users, and/or clients on the distributed network, thereby maintaining the security of the distributed system. In some embodiments, the information on the new tenant store, including the certificate collection, may not be publically available.

Flow continues to new loading operation 520. Operation 520 is similar to operation 508. At new loading operation 520, the new certificate collection is loaded to the virtual store. In some embodiments, the server loads the new certificate as a new virtual store. The virtual store may reside in memory that the device performing the method 500 has access to. In some embodiments, the server deletes the new virtual store after the server uses the virtual store. In other embodiments, the new virtual store is deleted after a predetermined amount of time after use of the new virtual store or after a specific event occurs after use of the new virtual store. For example, in some embodiments, the new virtual store is deleted when a request to validate is received for a third signing certificate after use of the virtual store. In another example, in some embodiments, the second virtual store is deleted 10 milliseconds, 8 seconds, 9 seconds, 12 seconds, 3 minutes, 8 minutes, 9 minutes, 35 minutes, 50 minutes, 55 minutes, 7 hours, 8 hours, 11 hours, 12 hours, 16 hours, or 3 days after use of the virtual store.

Flow continues to new validation operation 522. Operation 522 is similar to validation operation 510. At new validation operation 522, a determination is made as to whether the second signing certificate is valid using certificate requirements or a certificate from the virtual store. In some embodiments, after identifying the specific user (e.g., using an identifier) of the tenant, the user's corresponding certificate or certificate requirements from the certificate collection on the new virtual store is accessed. In these embodiments, a determination of whether the second signing certificate from the user is valid is made by utilizing the certificate requirements ore the certificate for the user listed within the new certificate collection saved on the server as the new virtual store. In these embodiments, the server validates the second signing certificate using the certificate requirements or certificate of the user from the new certificate collection. If a determination is made that the second signing certificate is invalid during operation 522, a notice of the invalid second signing certificate is sent to the client that sent the second signature certificate validation request. If a determination is made that the second signing certificate is valid during operation 522, a notice of the valid second signing certificate is sent to the client that sent the second signature certificate validation request.

In an alternative embodiment, a device performing the method 500 does not determine the validity of the second signing certificate during operations 522 of method 500 and instead during operation 522 identifies the certificate requirements or certificate that corresponds to the user of the new tenant from the new tenant's certificate collection on the virtual store and sends the user's certificate requirements or certificate to the client requesting validation of the second signing certificate. In this embodiment, the client utilizes the received certificate requirements or certificate to determine if the second signing certificate is valid. In some embodiments, the client determines that the second signing certificate from the user of the new tenant is valid if the user's certificate is the same as the user's second signing certificate and determines that the signing certificate from the user of the new tenant is invalid if the user's certificate is not the same as the user's second signing certificate.

In an alternate embodiment, a device performing the method 500 does not determine the validity of the second signing certificate during operations 522 of method 500 and instead during operation 522 sends the virtual store containing the new tenant's certificate collection to the client requesting validation. During these embodiments, the client uses the received new certificate collection from the virtual store to determine if the second signing certificate is valid. The client may identify the user's certificate requirements or certificate from the list in the certificate collection and utilizes the user's certificate requirements or certificate to determine if the user's signing certificate is valid. In some embodiments, the client determines that the second signing certificate from the user of the new tenant is valid if the user's signing certificate meets the user's certificate requirements and determines that the second signing certificate from the user of the new tenant is invalid if the user's signing certificate does not meet the user's certificate requirements.

While method 500 is directed to the receipt of two signing certificates, the method 500 may be employed to handle for several different signing signatures for several different clients (e.g., a first client, a second client, a third client, a fourth client, a fifth client, . . . a $n^{TH}$ client) for several devices (e.g., a first tenant, a second tenant, a third tenant, a fourth tenant, a fifth tenant, . . . a $n^{TH}$ tenant) simultaneously, at overlapping times, and/or at staggered times. Further, method 500 may be performed by several different servers (first server, second server, third server, a fourth server, a fifth server, . . . a $n^{TH}$ sever) within the distributed network for one or more clients simultaneously, at overlapping times, and/or at staggered times.

Figure 6:
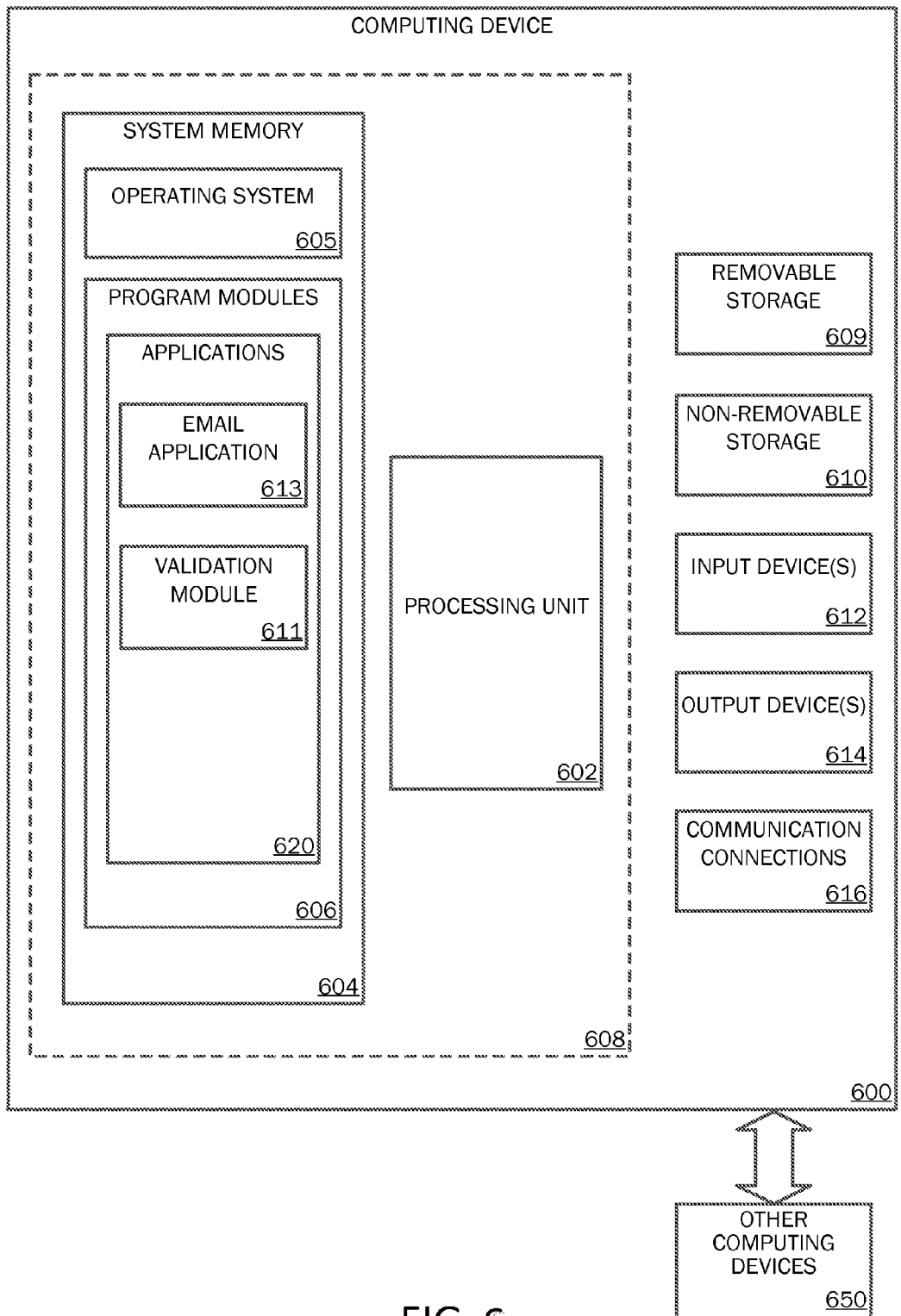
FIG. 6 is a block diagram illustrating example physical components of a computing device with which embodiments of the disclosure may be practiced.

FIGS. 6-9 and the associated descriptions provide a discussion of a variety of operating environments in which embodiments of the disclosure may be practiced. However, the devices and systems illustrated and discussed with respect to FIGS. 6-9 are for purposes of example and illustration and are not limiting of a vast number of computing device configurations that may be utilized for practicing embodiments of the disclosure, described herein FIG. 6 is a block diagram illustrating physical components (e.g., hardware) of a computing device 600 with which embodiments of the disclosure may be practiced. The computing device components described below may computer executable instructions for an email application 613, e.g., of a client and/or computer executable instructions for validation module 611, e.g., of a server, that can be executed to employ the methods 400 and 500 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as maintaining a session across a period of disconnection in regards to FIGS. 2-3 and, in particular, email application 613 or validation module 611. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., validation module 611 or email application) may perform processes including, but not limited to, the embodiment, as described herein. Other program modules that may be used in accordance with embodiments of the present disclosure, and in particular to generate screen content, may include electronic mail and contacts applications, word processing applications, spreadsheet applications, database applications, slide presentation applications, drawing, messaging applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
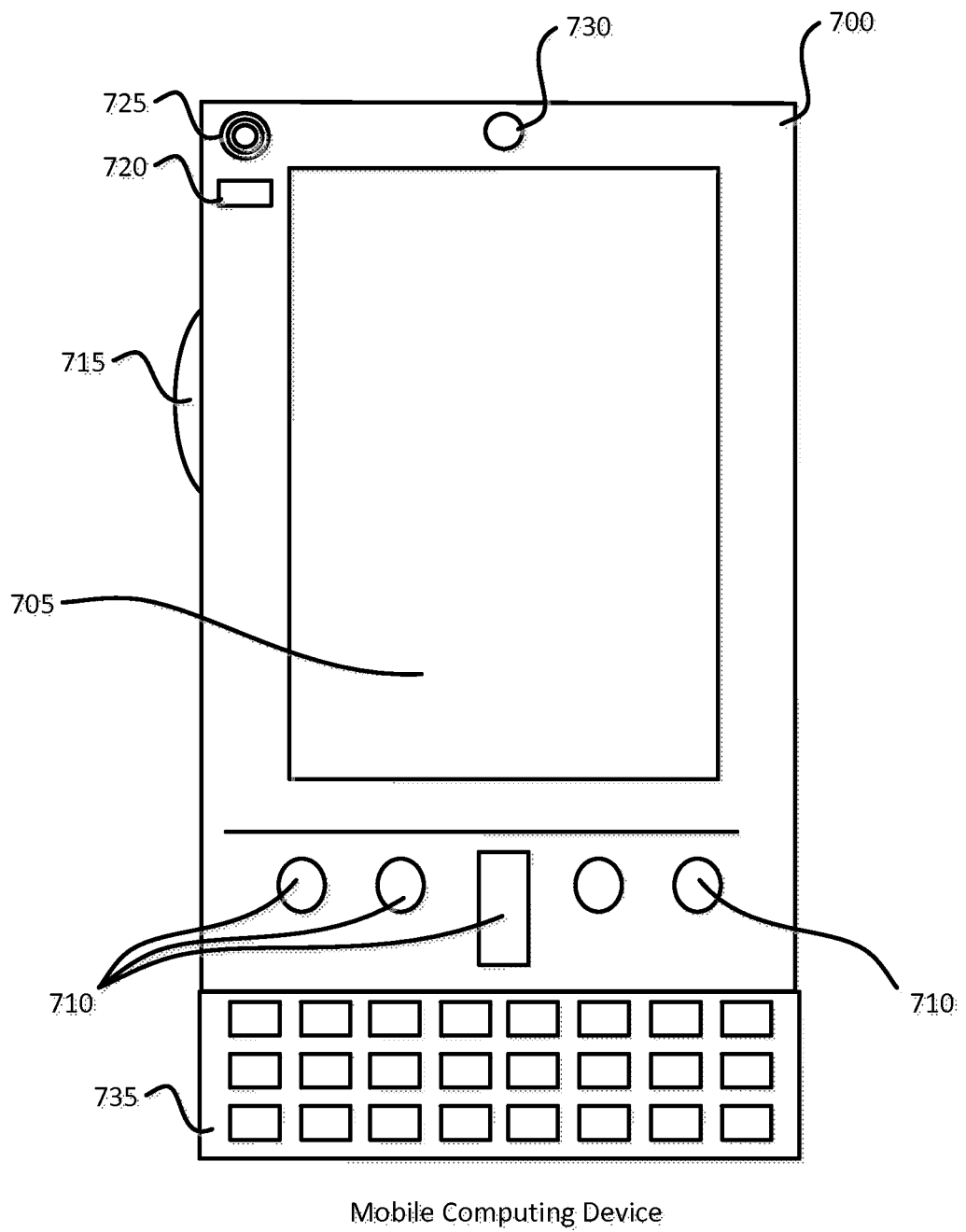
FIGS. 7A and 7B are simplified block diagrams of a mobile computing device with which embodiments of the present disclosure may be practiced.
Figure 7B:
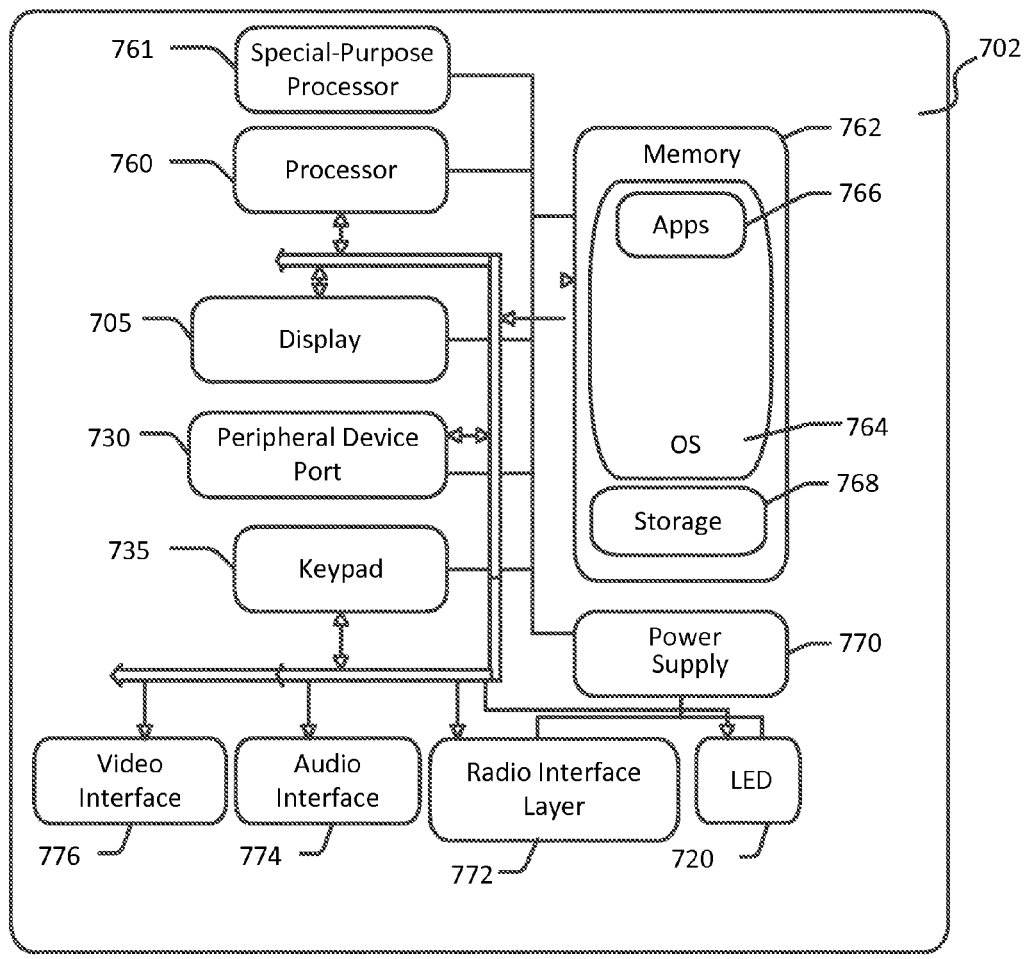

FIGS. 7A and 7B illustrate a mobile computing device 700, for example, a mobile telephone, a smart phone, wearable computer (such as a smart watch), a tablet personal computer, a laptop computer, and the like, with which embodiments of the disclosure may be practiced. In some embodiments, the client may be a mobile computing device. With reference to FIG. 7A, one embodiment of a mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (e.g., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions to validate a signing certificate in a multi-tenant environment as described herein (e.g., and/or optionally validation module 611).

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, for example, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
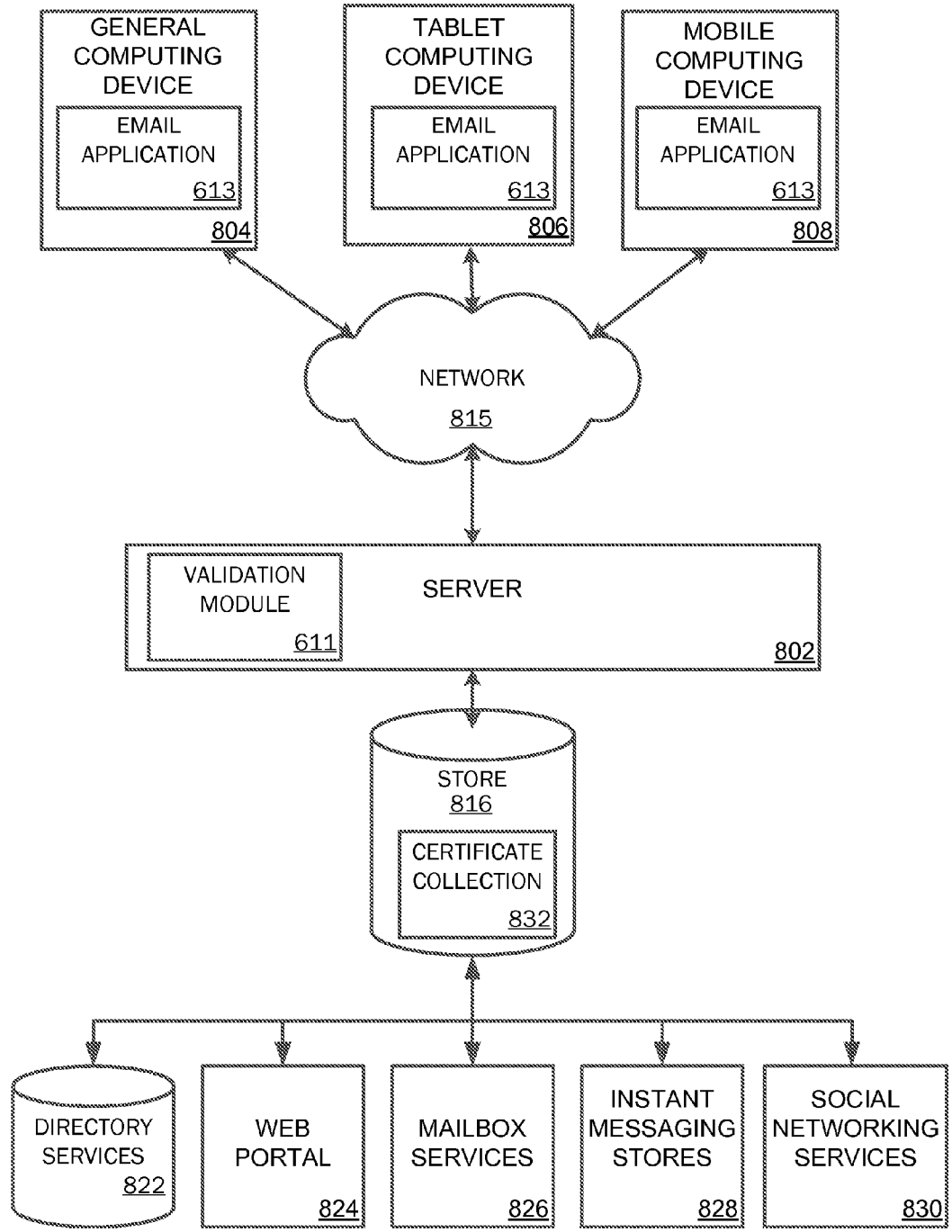
FIG. 8 is a simplified block diagram of a distributed computing system in which embodiments of the present disclosure may be practiced.

FIG. 8 illustrates one embodiment of the architecture of a system for processing data received at a computing system from a remote source, such as a computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830. The email application 613 (or productivity application, etc.) may be employed by a client who sends a request to server 802 to validate a signing certificate. The server 802 may employ the validation module 611 to perform methods 400 and/or 500 as described above. During the performance of methods 400 and/or 500 by server 802, the server may access a certificate collection 832 stored within store 816. By way of example, the client computing device may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A method for validating a custom signature, the method comprising:
   receiving, at a first server in a distributed network, a first request from a first client to validate a first signing certificate of a first user of a first message received by the first client wherein the first user sent the first message, and wherein the first signing certificate is from the first user of a first tenant;
   identifying, by the first server, the first tenant that relates to the first signing certificate from a plurality of tenants in response to the first request;
   accessing over the network, by the first server, a first tenant certificate collection from a first private tenant store on the distributed network after identifying the first tenant, wherein the first private tenant store is separate from the first tenant and the first server;
   loading, on the first server, the first tenant certificate collection from the first private tenant store as a first tenant virtual store upon receiving access to the first private tenant store; and
   performing validation of the first signing certificate using the first tenant virtual store by:
      identifying the first user of the first tenant;
      identifying certificate requirements for the identified first user listed within the first tenant certificate collection on the first tenant virtual store; and
      determining if the first signing certificate meets the certificate requirements of the first user.

2. The method of claim 1, wherein the performing validation of the first signing certificate using the first tenant virtual store further comprises:
   determining that the first signing certificate is valid; and
   sending validation of the first signing certificate to the first client.

3. The method of claim 1, wherein the performing validation of the first signing certificate using the first tenant virtual store further comprises:
   determining that the first signing certificate is invalid; and
   sending notice to the first client that the first signing certificate is invalid.

4. The method of claim 1, further comprising:
   receiving, at the first server in the distributed network, a second request from a second client to validate a second signing certificate of a second message received by the second client;
   identifying a second tenant that relates to the second signing certificate from the plurality of tenants in response to the second request;
   accessing a second tenant certificate collection from a second private tenant store on the distributed network after identifying the second tenant;
   loading, on the first server, the second tenant certificate collection as a second tenant virtual store; and performing validation of the second signing certificate using the second tenant virtual store.

5. The method of claim 4, wherein the performing validation of the second signing certificate using the second tenant virtual store further comprises:
determining that the second signing certificate is invalid; and
sending notice to the second client that the second signing certificate is invalid.

6. The method of claim 4, wherein the performing validation of the second signing certificate using the second tenant virtual store further comprises:
determining that the second signing certificate is valid; and
sending validation of the second signing certificate to the second client.

7. The method of claim 4, wherein the first tenant virtual store and the second tenant virtual store are loaded on the first server at the same time.

8. The method of claim 4, wherein the first server receives the first request to validate the first signing certificate from the first client and the second request to validate the second signing certificate from the second client at the same time.

9. The method of claim 4, wherein the first tenant virtual store is deleted when the first server receives the second request to validate the second signing certificate from the second client.

10. The method of claim 1, wherein the method is performed in accordance with s/mime protocol.

11. The method of claim 1, further comprising:
receiving, at a second server on the distributed network, a third request from a third client to validate a third signing certificate of a third message received by the third client;
identifying, by the second server, a third tenant that relates to the third signing certificate from the plurality of tenants in response to the third request;
accessing, by the second server, a third tenant certificate collection from a third private tenant store on the distributed network after identifying the first tenant;
loading, on the second server, the third tenant certificate collection as a third tenant virtual store; and
performing validation of the third signing certificate using the third tenant virtual store.

12. The method of claim 1, wherein the first client comprises at least one of:
a mobile telephone;
a smart phone;
a tablet;
a smart watch;
a wearable computer;
a personal computer;
a desktop computer; and
a laptop computer.

13. The method of claim 1, wherein the distributed network communicates with the first client for providing data to at least one of:
an email application;
a social networking application;
a collaboration application;
an enterprise management application;
a messaging application;
a word processing application;
a spreadsheet application;
a database application;
a presentation application;
a contacts application; and
a calendaring application.

14. The method of claim 1, wherein the first private tenant store on the distributed network receives a set of certificates from a first tenant administrator to form the first tenant certificate collection.

15. A system comprising:
a distributed network of servers for data exchange with a client executed at least in part by a computing device, the computing device comprising:
at least one processor;
a memory for containing computer-executable instructions, which when executed by the at least one processor, cause a server to perform a method comprising:
receiving a first request from a first client to validate a first signing certificate of a first user of a first message received by the first client, wherein the first user sent the first message, and wherein the first signing certificate is from the first user of a first tenant;
identifying the first tenant that relates to the first signing certificate from a plurality of tenants in response to the first request;
requesting access to a first tenant certificate collection stored in a first private tenant store after identifying the first tenant, where the first private tenant store is separate from the first tenant and the first client and is accessed via a network;
loading the first tenant certificate collection upon receiving access to the first private tenant store; and
performing validation of the first signing certificate using the first tenant certificate collection by:
identifying the first user of the first tenant;
identifying certificate requirements for the identified first user listed within the first tenant certificate collection on a first tenant virtual store; and
determining if the first signing certificate meets the certificate requirements of the first user.

16. The system of claim 15, wherein the method further comprises:
receiving a second request from the first client to validate a second signing certificate of a second message received by the first client;
identifying a second tenant that relates to the second signing certificate from the plurality of tenants in response to the second request;
requesting access to a second tenant certificate collection stored in a second private tenant store after identifying the second tenant;
loading the second tenant certificate collection;
performing validation of the second signing certificate using the second tenant certificate collection;
receiving a third request from a second client to validate a third signing certificate of a third message received by the second client;
identifying a third tenant that relates to the third signing certificate from the plurality of tenants in response to the third request;
requesting access to a third tenant certificate collection stored in a third private tenant store in after identifying the third tenant;
loading the third tenant certificate collection; and
performing validation of the third signing certificate using the third tenant certificate collection.

17. The system of claim 16, wherein the first private tenant store, the second private tenant store, and the third private tenant store are separately stored and isolated from each other on the distributed network of servers.

18. A computer-readable storage medium comprising computer-executable instructions stored thereon which, when executed by a computing system in a distributed network, cause the computing system to perform a method comprising:

receiving a first request from a first client to validate a first signing certificate from a first user of a first message received by the first client, wherein the first user sent the first message, and wherein the first signing certificate is from the first user of a first tenant;

identifying the first tenant that relates to the first signing certificate from a plurality of tenants;

requesting access to a first tenant certificate collection stored in a first private tenant store through a network after identifying the first tenant, wherein the first private tenant store is separate from the first client;

reading the first tenant certificate collection on the first private tenant store upon gaining access to the first private tenant store;

loading the first tenant certificate collection as a first tenant virtual store; and determining that the first signing certificate is valid using the first tenant virtual store by:

identifying the first user of the first tenant;

identifying certificate requirements for the identified first user listed within the first tenant certificate collection on the first tenant virtual store; and determining if the first signing certificate meets the certificate requirements of the first user;

receiving a second request from a second client to validate a second signing certificate from a second user of a second message received by the second client wherein the second user sent the second message, and wherein the second signing certificate is from the second user of a second tenant;

identifying the second tenant that relates to the second signing certificate from the plurality of tenants;

requesting access through the network to a second tenant certificate collection on a second private tenant store after identifying the second tenant, wherein the second private tenant store is separate from the second client;

reading the second tenant certificate collection on the second private tenant store upon receiving access to the second private tenant store;

loading the second tenant certificate collection as a second tenant virtual store; and determining that the second signing certificate is valid using the second tenant virtual store by:

identifying the second user of the second tenant;

identifying certificate requirements for the identified second user listed within the second tenant certificate collection on the second tenant virtual store; and determining if the second signing certificate meets the certificate requirements of the second user.

\* \* \* \* \*